US 11,893,568 B1

United States Patent
Buentello et al.

(10) Patent No.: US 11,893,568 B1
(45) Date of Patent: *Feb. 6, 2024

(54) AUTOMATED PROXIMITY FRAUD ACCOUNT LOCK SYSTEMS AND METHODS

(71) Applicant: United Services Automobile Association (USAA), San Antonio, TX (US)

(72) Inventors: Andre Rene Buentello, San Antonio, TX (US); David Alexander Lilley, Schertz, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,613

(22) Filed: Feb. 10, 2023

Related U.S. Application Data

(63) Continuation of application No. 15/641,654, filed on Jul. 5, 2017, now Pat. No. 11,587,063.

(Continued)

(51) Int. Cl.
*G06Q 20/32* (2012.01)
*G06Q 20/38* (2012.01)
(Continued)

(52) U.S. Cl.
CPC ........... *G06Q 20/327* (2013.01); *G06Q 20/20* (2013.01); *G06Q 20/382* (2013.01); *G06Q 20/405* (2013.01); *H04W 76/10* (2018.02)

(58) Field of Classification Search
None
See application file for complete search history.

(56) References Cited

U.S. PATENT DOCUMENTS

| 6,105,008 A * | 8/2000 | Davis | G06Q 20/04 705/41 |
| 6,446,004 B1 * | 9/2002 | Cao | G06F 9/542 701/484 |

(Continued)

FOREIGN PATENT DOCUMENTS

| WO | 2015130967 A1 | 9/2015 | |
| WO | WO-2015130967 A1 * | 9/2015 | ........... G06Q 20/108 |

(Continued)

OTHER PUBLICATIONS

C. Kier, G. Madlmayr, A. Nawratil, M. Schafferer, C. Schanes and T. Grechenig, "Mobile Payment Fraud: A Practical View on the Technical Architecture and Starting Points for Forensic Analysis of New Attack Scenarios," 2015 Ninth International Conference on IT Security Incident Management & IT Forensics, Year: 2015.

*Primary Examiner* — Neha Patel
*Assistant Examiner* — Jahed Ali
(74) *Attorney, Agent, or Firm* — Perkins Coie LLP

(57) ABSTRACT

Methods and systems described in this disclosure for protecting one or more consumer accounts. In one implementation, the system includes a security device and a portable computing device. The portable computing device detects whether it is in proximity to the security device. When the portable computing device is in proximity to the security device, one or more consumer accounts associated with the portable computing device is permitted to be used in a transaction. When the portable computing device is not in proximity to the security device, one or more consumer accounts is prevented from being used in the transaction.

20 Claims, 5 Drawing Sheets

Related U.S. Application Data

(60) Provisional application No. 62/358,989, filed on Jul. 6, 2016.

(51) Int. Cl.
  *G06Q 20/20* (2012.01)
  *G06Q 20/40* (2012.01)
  *H04W 76/10* (2018.01)

(56) References Cited

U.S. PATENT DOCUMENTS

| | | | |
|---|---|---|---|
| 9,805,365 B2 * | 10/2017 | Chen | H04W 12/06 |
| 10,026,078 B1 * | 7/2018 | Nolan | G06Q 20/3572 |
| 10,204,333 B2 * | 2/2019 | Fourez | G06Q 20/40 |
| 10,206,099 B1 * | 2/2019 | Trinh | H04W 4/021 |
| 10,289,999 B2 * | 5/2019 | Gauthier | G06Q 20/204 |
| 10,304,053 B1 * | 5/2019 | Templeton | G06Q 20/12 |
| 10,395,243 B1 * | 8/2019 | Johansson | G06Q 40/00 |
| 11,379,829 B1 * | 7/2022 | Duke | G06Q 20/108 |
| 2004/0127256 A1 * | 7/2004 | Goldthwaite | G06K 7/0073 |
| | | | 455/466 |
| 2004/0243498 A1 * | 12/2004 | Duke | G06Q 99/00 |
| | | | 705/35 |
| 2006/0136742 A1 * | 6/2006 | Giobbi | G06Q 20/12 |
| | | | 713/185 |
| 2007/0055630 A1 * | 3/2007 | Gauthier | G06Q 20/352 |
| | | | 705/44 |
| 2009/0249478 A1 * | 10/2009 | Rosener | G06F 21/31 |
| | | | 726/19 |
| 2010/0006641 A1 * | 1/2010 | Boutcher | G06Q 20/40 |
| | | | 235/379 |
| 2010/0318528 A1 * | 12/2010 | Kupershmidt | G16B 30/00 |
| | | | 707/769 |
| 2011/0137804 A1 * | 6/2011 | Peterson | G06Q 20/3224 |
| | | | 705/77 |
| 2012/0204307 A1 * | 8/2012 | De Mattei | H04N 21/431 |
| | | | 2/69 |
| 2012/0246060 A1 * | 9/2012 | Conyack, Jr. | G06Q 40/02 |
| | | | 705/38 |
| 2013/0124346 A1 * | 5/2013 | Baldwin | G06Q 20/4015 |
| | | | 705/16 |
| 2013/0332358 A1 * | 12/2013 | Zhao | G06Q 20/425 |
| | | | 705/44 |
| 2014/0123224 A1 * | 5/2014 | Nosrati | H04W 12/50 |
| | | | 726/3 |
| 2014/0129441 A1 * | 5/2014 | Blanco | G06Q 20/401 |
| | | | 705/44 |
| 2014/0138435 A1 * | 5/2014 | Khalid | G06Q 20/227 |
| | | | 235/380 |
| 2014/0258113 A1 * | 9/2014 | Gauthier | G06Q 20/385 |
| | | | 705/41 |
| 2015/0134428 A1 * | 5/2015 | Li | G06Q 20/326 |
| | | | 705/13 |
| 2015/0186876 A1 * | 7/2015 | Chen | G06Q 20/3674 |
| | | | 705/67 |
| 2015/0294362 A1 * | 10/2015 | Royyuru | G06Q 30/0261 |
| | | | 705/14.58 |
| 2015/0304291 A1 * | 10/2015 | Cook | H04W 12/126 |
| | | | 713/159 |
| 2016/0065616 A1 * | 3/2016 | Srikanth | G06F 21/62 |
| | | | 726/1 |
| 2016/0125396 A1 * | 5/2016 | Brickell | G06Q 20/382 |
| | | | 705/67 |
| 2016/0125412 A1 * | 5/2016 | Cannon | G06Q 20/4014 |
| | | | 705/44 |
| 2016/0189143 A1 * | 6/2016 | Koeppel | G08B 21/0277 |
| | | | 705/41 |
| 2016/0197988 A1 * | 7/2016 | Prasad | G06F 16/278 |
| | | | 709/202 |
| 2016/0203471 A1 * | 7/2016 | Zand | G06Q 20/341 |
| | | | 705/41 |
| 2016/0277380 A1 * | 9/2016 | Wagner | H04L 63/0861 |
| 2016/0321663 A1 * | 11/2016 | Batlle | G06Q 20/405 |
| 2016/0379205 A1 * | 12/2016 | Margadoudakis | H04W 4/80 |
| | | | 705/71 |
| 2017/0012972 A1 * | 1/2017 | Tanaka | G06F 1/1698 |
| 2017/0048272 A1 * | 2/2017 | Yamamura | H04L 63/10 |
| 2017/0061414 A1 * | 3/2017 | Castinado | G06Q 20/206 |
| 2017/0140383 A1 * | 5/2017 | Guo | G06Q 20/34 |
| 2017/0168595 A1 * | 6/2017 | Sakaguchi | G06F 1/1694 |
| 2018/0025351 A1 * | 1/2018 | Chen | G06Q 20/322 |
| | | | 705/67 |
| 2018/0121925 A1 * | 5/2018 | Gaikar | H04W 4/80 |
| 2018/0270328 A1 * | 9/2018 | Agarwal | H04L 67/75 |
| 2018/0276673 A1 * | 9/2018 | Van Os | G06Q 20/4014 |
| 2019/0268329 A1 * | 8/2019 | Toth | G06F 21/6209 |
| 2019/0355082 A1 * | 11/2019 | McMillan | G16H 50/80 |
| 2019/0392423 A1 * | 12/2019 | Agarwal | G06Q 20/34 |
| 2020/0126060 A1 * | 4/2020 | Hefetz | G06Q 20/3224 |
| 2020/0219105 A1 * | 7/2020 | Mossoba | G06Q 20/42 |

FOREIGN PATENT DOCUMENTS

| | | | |
|---|---|---|---|
| WO | 2015184389 A1 | 12/2015 | |
| WO | WO-2015184389 A1 * | 12/2015 | G06K 9/78 |

* cited by examiner

AUTOMATED PROXIMITY FRAUD ACCOUNT LOCK SYSTEMS AND METHODS

CROSS-REFERENCE TO RELATED APPLICATIONS

This application is a continuation of U.S. patent application Ser. No. 15/641,654 filed Jul. 5, 2017, now allowed, which is a non-provisional of and claims priority to U.S. Provisional Application No. 62/358,989 filed Jul. 7, 2016, entitled "AUTOMATED PROXIMITY FRAUD ACCOUNT LOCK SYSTEMS AND METHODS," which are all hereby incorporated by reference in their entireties for all purposes.

TECHNICAL FIELD

Various embodiments of the present disclosure generally relate to security of accounts. More specifically, various embodiments of the present disclosure relate to methods and systems for preventing unauthorized use of a financial account.

BACKGROUND

Consumers often have many financial accounts. Each account may have an associated payment card that allows the consumer to utilize the financial account in transactions with merchants. For example, the merchant may have a point-of-sale terminal that allows the consumer to swipe their payment card. The point-of-sale terminal then verifies the financial account information and processes the transaction.

BRIEF DESCRIPTION OF THE DRAWINGS

Embodiments of the present disclosure will be described and explained through the use of the accompanying drawings in which.

DETAILED DESCRIPTION

Figure 1:
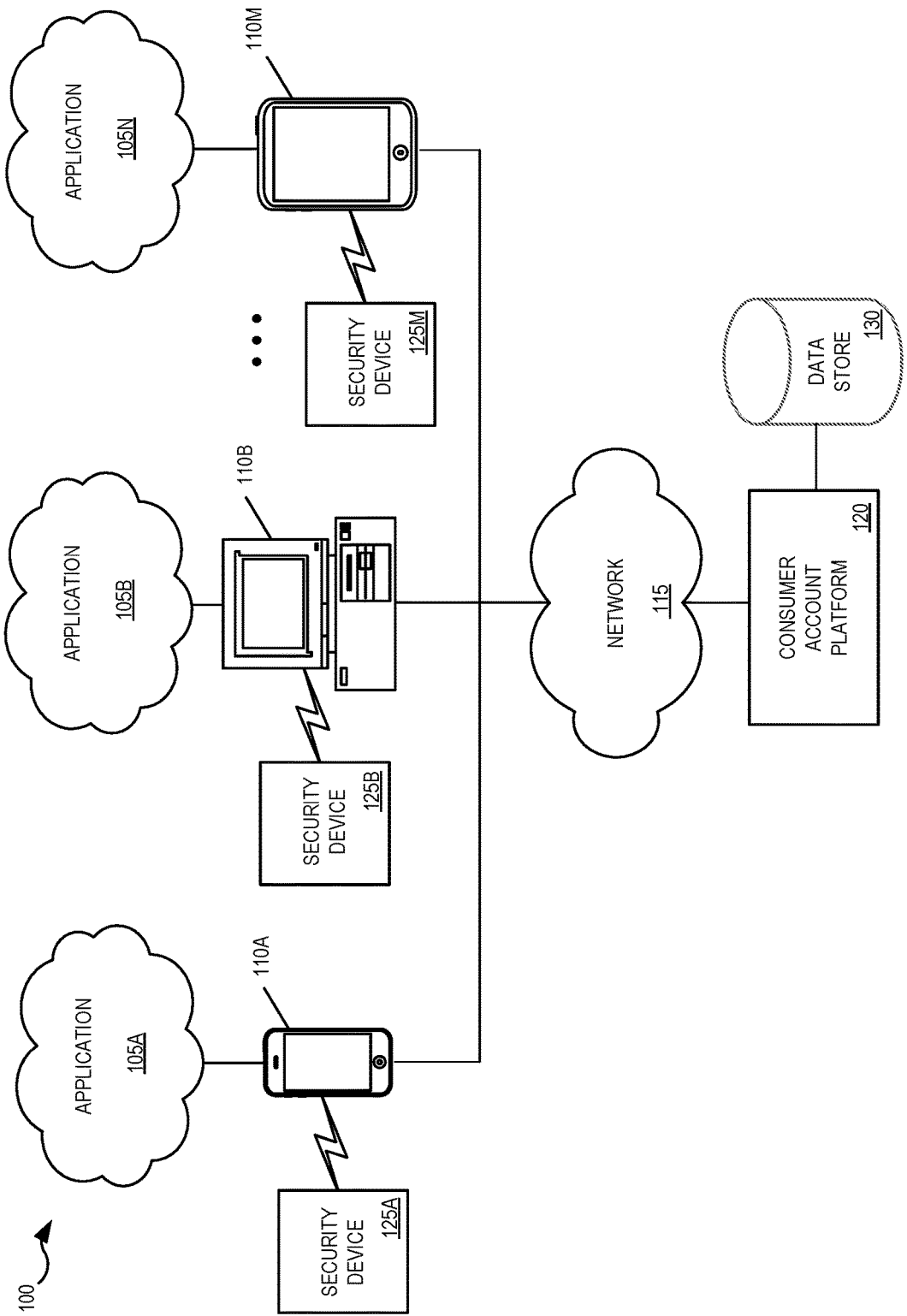
FIG. 1 illustrates an example of a network-based operating environment in which some embodiments of the present disclosure may be used.

Various embodiments of the present disclosure generally relate to security of accounts. More specifically, various embodiments of the present disclosure relate to methods and systems for preventing unauthorized use of a financial account.

Today, some financial institutions lock or close a consumer's account when a payment card associated with the account is lost or stolen. The consumer typically notifies the financial institution that the payment card is lost or stolen. However, there may be a delay between when the payment card is lost and when the consumer notices it is gone and contacts the financial institution. During this interim period, the payment card may be used for fraudulent transactions.

Embodiments are disclosed herein that allow a user's computing device (such as a mobile phone) to identify whether a payment card is near the user. The payment card includes a security device that can communicate with a user's mobile phone. For example, the payment card may include a Bluetooth device that can be paired with the user's mobile phone.

When a user attempts to use the payment card in a transaction, the mobile phone can verify that the payment card is nearby. The mobile phone may perform this verification by detecting that the payment card is paired with the phone. If the payment card is not paired, then the mobile phone can lock (or send a message to a server to lock) the consumer's account associated with the payment card and prevent the transaction from proceeding. If the payment card is paired with the mobile phone, then it is assumed that the payment card is in the user's possession, and the transaction is permitted to proceed. In some embodiments, the user's account may be locked automatically when the payment card is out of range of the mobile phone, whether a transaction is taking place or not. In other embodiments, the payment card must be within a certain distance of the mobile phone (e.g., five feet).

In other embodiments, the system may notify the user when the payment card is out of range of the mobile phone's wireless communication. This notification may alert the user when the payment card is misplaced or stolen. The user may be given an option to lock the account associated with payment card or allow the account to be used.

In some embodiments, the user's mobile phone may be paired with other types of security devices to ensure a transaction is permitted. For example, the mobile phone may pair with a ring, a wallet, a watch, a necklace, a wristband, a purse, or other token that is associated with the user's financial account. If a transaction using the financial account is requested, then the mobile phone detects whether the phone is paired with the security device. If the mobile phone and the security device are not paired, then the system prevents the transaction from being completed. If they are paired, then the transaction is allowed to proceed.

Alternatively, the security device may be a component of a point-of-sale terminal at a merchant. The user's mobile phone may receive information regarding the location of the terminal and information about the merchant. If the terminal is not near the user's mobile phone, then transactions at that terminal may be prevented. If the terminal and mobile phone are near one another, then transactions at that terminal may be permitted. Transactions may also be prevented if the merchant is not approved by the user, or if the transaction amount exceeds a limit set by the user or the financial institution.

This disclosure describes systems and processes designed to increase security of a user's financial accounts by preventing transactions from occurring when a security device is not near the user. Various embodiments may provide one or more of the following technological improvements: (1) automatic locking of one or more of a user's financial accounts; (2) lower chances of fraudulent transactions; (3) notifications when a user's wallet, purse, or payment card(s) are misplaced; and (4) improved ability for a user to approve or deny a payment transaction.

In the following description, for the purposes of explanation, numerous specific details are set forth in order to provide a thorough understanding of embodiments of the present disclosure. However, on reading the disclosure, it will be apparent to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). One or more of the computing devices 110A-110M include mechanisms for communicating via a network 115 with a consumer account platform 120.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies, such as secure sockets layer (SSL), transport layer security (TLS), and Internet protocol security (IPsec).

The consumer account platform 120 accesses and modifies information about one or more consumer financial accounts. The account information may be stored in one or more data stores 130. The data store 130 can be used to manage storage and access to financial account data, such as account numbers, account balances, account limits, and/or status of the accounts (e.g., active, locked, closed). The data store 130 may be a data repository of a set of integrated objects that are modeled using classes defined in database schemas. The data store 130 may further include flat files that can store data.

The consumer account platform 120 may be a financial institution (such as a bank, credit union, or credit card company) or a third-party organization in communication with one or more financial institutions. In some embodiments, the consumer account platform 120 is a server or is an application running on one or more servers. The consumer account platform 120 and/or other servers may collect, access and/or modify data from the data store 130.

The computing devices 110A-110M are configured to retrieve and submit information to the consumer account platform 120 and run one or more applications with customized content provided by the consumer account platform 120. For example, the computing devices 110A-110M can execute a browser application or a customized client to enable interaction between the computing devices 110A-110M and the consumer account platform 120.

In some embodiments, the consumer account platform 120 provides the computing devices 110A-110M with information about one or more consumer accounts. The consumer account information may include account numbers, account balances, account limits, and/or status of the accounts (e.g., active, locked, closed). The computing devices 110A-110M are configured to submit instructions to the consumer account platform 120 to change the status of one or more consumer accounts. For example, the computing devices 110A-110M may instruct the consumer account platform 120 to lock or close a particular consumer account when the particular consumer account is at a higher risk of being used in a fraudulent transaction. The computing devices 110A-110M may also instruct the consumer account platform 120 to unlock or open the particular consumer account when the risk of a fraudulent transaction is low.

Each of the computing devices 110A-110M also include mechanisms for communicating with an associated security device 125A-125M. The computing devices 110A-110M may determine the risk of a consumer account being used in a fraudulent transaction based at least in part on the proximity to the security devices 125A-125M to their corresponding computing devices 110A-110M. In some embodiments, the security devices 125A-125M are low energy wireless devices associated with one or more consumer accounts. For example, the low energy wireless device may be a component of a payment card associated with one or more particular consumer accounts. Alternatively, in some embodiments, the security devices 125A-125M may be physical tokens that a consumer carries or wears, such as a ring, a wallet, a watch, a necklace, a wristband, or a purse. The security devices 125A-125M may also be components of point-of-sale terminals utilized by merchants for processing purchase transactions. The security devices 125A-125M may utilize protocols such as Bluetooth, near-field communication (NFC), or WiFi to communicate with the computing devices 110A-110M.

The following description utilizes a particular computing device 110 and a particular security device 125. The computing device 110 may be any one of the computing devices 110A-110M. In a preferred embodiment, the computing device 110 is a portable computing device such as a mobile telephone, a tablet, or a wearable device. The security device 125 may be any one of the security devices 125A-125M associated with the computing device 110.

The computing device 110 may be associated with a corresponding security device 125 by initially pairing the computing device 110 to the security device 125. The security device 125 may be provided to a consumer by a financial institution or by a third-party organization in communication with one or more financial institutions. The security device 125 may be associated with one particular consumer account or with multiple consumer accounts. In some embodiments, the consumer links the security device

125 to one or more particular consumer accounts by viewing and selecting the security device 125 in an application on the computing device 110 after the security device is initially paired to the computing device 110.

When one or more of the consumer accounts is requested to be used in a purchase transaction, the computing device 110 may detect whether the security device 125 associated with the consumer account is in proximity to the computing device 110. The computing device 110 may determine the proximity of the corresponding security device 125 by attempting to wirelessly communicate with the security device 125. If the communication is successful, then the computing device 110 may assume that the corresponding security device 125 is nearby. If the communication is not successful, then the computing device 110 may assume that the corresponding security device 125 is not within range for wireless communication. In some embodiments, the computing device 110 provides a notification to the consumer when the computing device 110 and security device 125 are not in proximity to one another. For example, the computing device 110 may display a message and/or initiate an alarm when the security device 125 goes out of communication range with the computing device 110.

Alternatively, the computing device 110 may determine the proximity of a corresponding security device 125 by determining a location of the corresponding security device 125 and comparing its location to the location of the computing device 110. For example, the security device 125 may be a component of a point-of-sale terminal at a merchant. When a purchase transaction is requested at the point-of-sale terminal, the location of the merchant may be provided to the computing device 110. The computing device 110 may then compare its location (provided by a location service, such as the Global Positioning System) to the location of the merchant.

If the computing device 110 and security device 125 are in proximity to one another, then the consumer account associated with the security device 125 may be permitted for use in the purchase transaction. If the computing device 110 and security device 125 are not in proximity to one another, then the consumer account associated with the security device 125 may be prevented from being used in the purchase transaction. The computing device 110 may prevent the use of the consumer account by instructing the consumer account platform 120 to lock or close the corresponding consumer account. Alternatively or in addition, the computing device 110 may provide a notification to the consumer that a purchase transaction has requested the use of the consumer account. The consumer may then approve or deny the use of the consumer account for the purchase transaction.

In some embodiments, the computing device 110 or consumer account platform 120 may perform additional verification before permitting the purchase transaction to proceed. For example, the computing device 110 may identify whether a merchant associated with the point-of-sale terminal is an approved merchant. The computing device 110 may store a whitelist of one or more merchants the consumer account at which it is approved to be used. If the merchant is on the whitelist, then the consumer account is permitted to be used in the transaction. If the merchant is not on the whitelist, then the consumer account is prevented from being used in the transaction.

Furthermore, in some embodiments, the computing device 110 or consumer account platform 120 may identify a transaction limit associated with the consumer account. If the amount of the purchase transaction exceeds the transaction limit, then the consumer account is prevented from being used for the purchase transaction.

Figure 2:
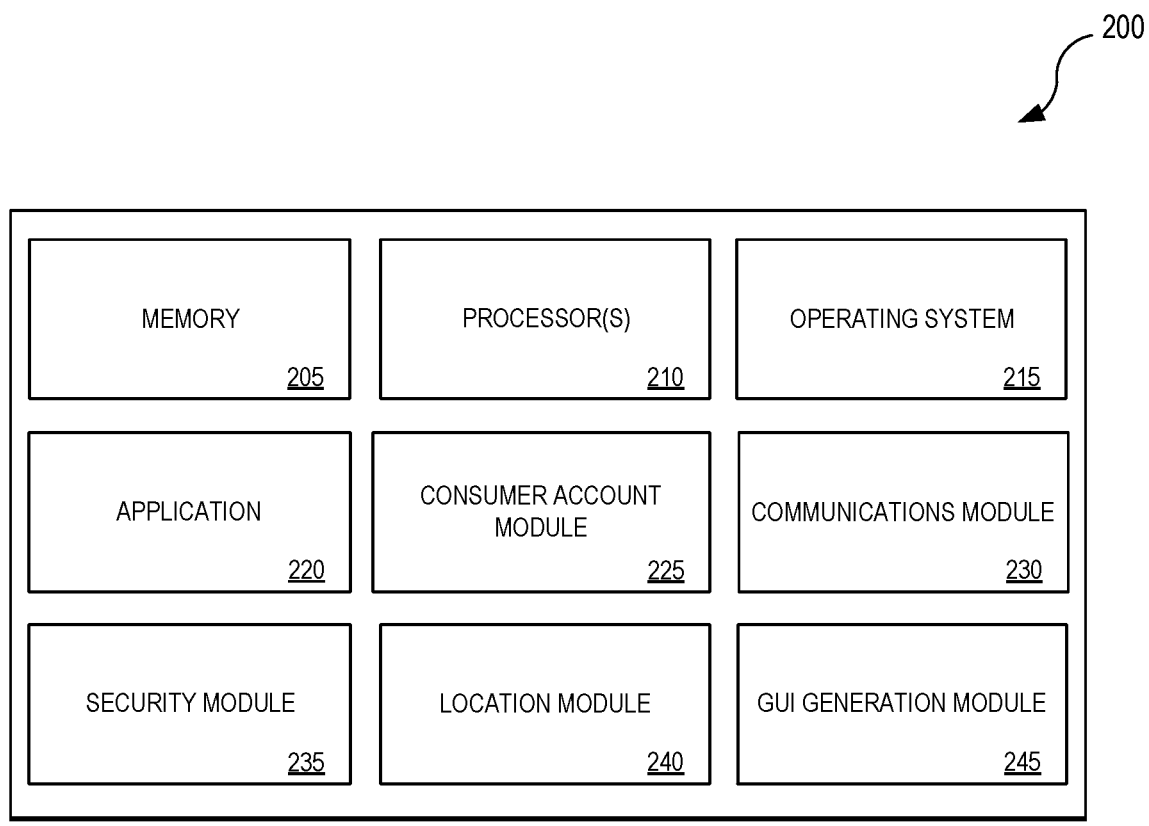
FIG. 2 illustrates a set of components within a computing device according to one or more embodiments of the present disclosure.

FIG. 2 illustrates a set of components 200 within a computing device 110 according to one or more embodiments of the present disclosure. According to the embodiments shown in FIG. 2, the computing device 110 can include memory 205, one or more processors 210, operating system 215, application 220, consumer account module 225, communications module 230, security module 235, location module 240, and graphical user interface (GUI) generation module 245. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and consumer account module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, consumer account module 225, communications module 230, security module 235, location module 240, and GUI generation module 245.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow the computing device 110 to interact with a consumer and with the consumer account platform 120. For example, application 220 can include an application for financial services, a money transfer application, a social networking application, and a gaming application.

Application 220 can access a server and/or a platform associated with a financial institution or third-party organization (e.g., consumer account platform 120) to retrieve information and provide instructions. For example, application 220 may be used to provide account information and security device information to a user. The application 220 may allow a user to select a security device 125 to be associated with one or more consumer accounts. The application 220 may also provide notifications to the user when one or more of the consumer accounts are being used in a transaction, and whether the associated security device 125 is in proximity to the computing device 110. The application 220 may also allow a user to view other information associated with a consumer account, such as account balance, account limit, and/or account status.

Consumer account module 225 may be used in combination with the application 220 and communications module 230 to access and modify consumer account information. The consumer account module 225 may store user credentials for accessing the consumer account platform 120. The user credentials may allow the consumer account module 225 to receive and modify information associated with a user's consumer account(s). For example, the consumer account module 225 may lock or close a consumer account to prevent fraudulent activity. The consumer account module 225 may also securely store account information received from the consumer account platform 120, and provide the account information to the application 220.

Communications module 230 can exchange communication with one or more security devices (e.g., security devices 125A-125M) and/or a server (e.g., consumer account platform 120). For example, communications module 230 may facilitate a computing device 110 being paired with a security device 125. The communications module 230 may also detect whether a security device 125 is in proximity to the computing device 110. In some embodiments, the communications module 230 receives information associated with a requested purchase transaction. For example, the communications module 230 may receive a transaction amount and merchant information associated with the transaction. The communications module 230 may provide the transaction information to the application 220 which determines whether the transaction can proceed.

Security module 235 may be used in combination with the application 220 and communications module 230 to access and modify security device information. The security device information may include identifiers for one or more security devices 125. The identifier allows the computing device 110 to determine whether a security device 125 has been previously paired with the computing device 110, and which consumer account(s) is associated with the security device 125. The security module 235 may also utilize the identifier in determining the authenticity of a security device 125. For example, the identifier may include a signed certificate that verifies the security device 125 as authentic.

Location module 240 may be used to identify the location of the computing device 110. The location module 240 may utilize the Global Positioning System (GPS), internet protocol (IP) information, cell tower information, access point information, or other location identifiers to determine an approximate location of the computing device 110. The computing device 110 may compare its location to the location of a security device when determining whether a purchase transaction should proceed.

GUI generation module 245 can generate one or more GUI screens that allow for interaction with a user. In at least one embodiment, GUI generation module 245 generates a graphical user interface receiving and/or conveying information to the user. For example, the GUI generation module 245 may display information from the application 220 regarding a purchase transaction using one or more of the user's consumer accounts. The GUI generation module 245 may also generate a notification to the user when a security device 125 goes out of range of the communications module 230.

Figure 3:
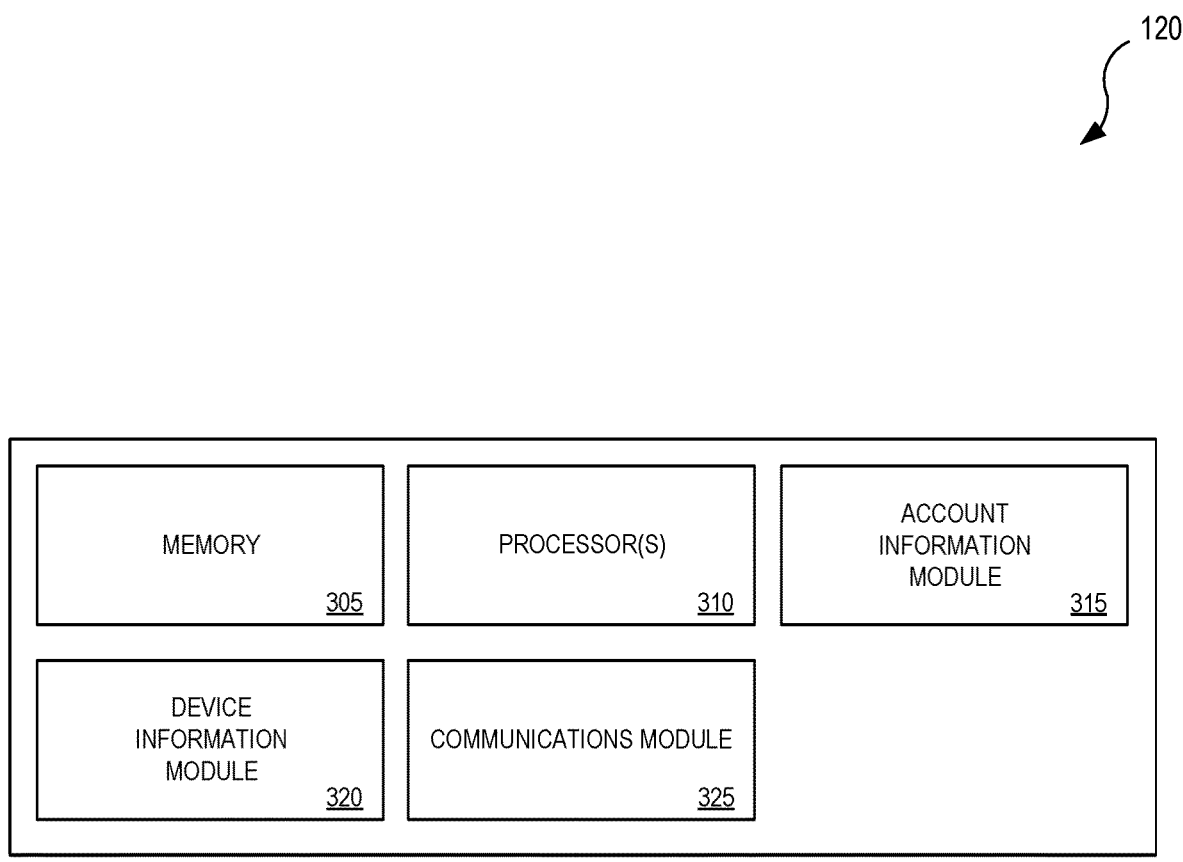
FIG. 3 illustrates a set of components within a consumer account platform according to one or more embodiments of the present disclosure.

FIG. 3 illustrates a set of components within consumer account platform 120 according to one or more embodiments of the present disclosure. According to the embodiments shown in FIG. 3, consumer account platform 120 can include memory 305, one or more processors 310, account information module 315, device information module 320, and communications module 325. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 may be used to store instructions for running one or more applications or modules on processor(s) 310. For example, memory 305 could be used in one or more embodiments to house all or some of the instructions needed to execute the functionality of the account information module 315, device information module 320, and communications module 325.

Account information module 315 can access, retrieve, and modify account information from one or more financial institutions. For example, the account information module 315 may retrieve account balance, account limit, and account status information for a consumer's financial account. The account information module 315 may also change the account status based on instructions from a user's computing device 110. For example, the account information module 315 may change the account status to locked or closed if the user's computing device 110 determines that the financial account is at risk of being used in a fraudulent transaction.

Device information module 320 may store and modify information associated with a user's computing device and/or security device. The information may include identifiers associated with the user's computing device 110 and/or security device. The identifiers may be linked to one or more of the user's financial accounts. The consumer account platform 120 may utilize the device information to verify whether a device accessing the consumer account platform 120 is authorized to view and modify particular financial account information.

Communications module 325 can exchange communications with one or more computing devices 110. For example, the communications module 325 may transmit account information to a computing device 110. The communications module 325 may also receive instructions to modify the account status of one or more consumer accounts from the computing device 110. Communications module 325 may further communicate with a merchant computing device or POS to authorize or deny a transaction based on information received by account information module 315 (e.g., authorize transaction when the security device 125 is in proximity to the mobile device, deny a transaction when the security device is not in proximity to the mobile device, send message to the mobile device when the security device is not in proximity to the mobile device).

Figure 4:
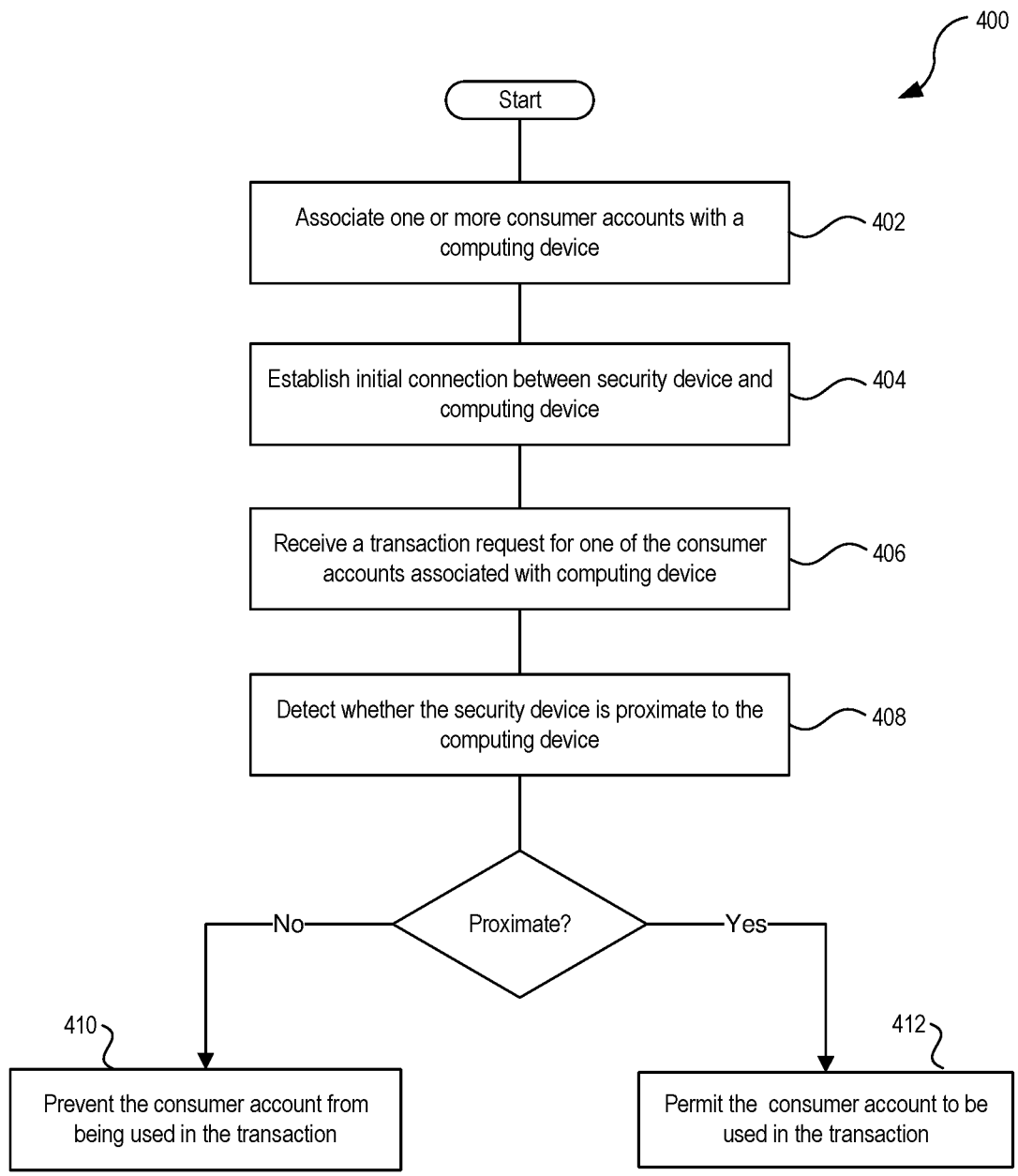
FIG. 4 is a flowchart illustrating a set of operations for protecting one or more consumer accounts.

FIG. 4 is a flowchart illustrating a set of operations for protecting one or more consumer accounts. In some embodiments, fewer than all of the operations in the set of operations are performed, whereas, in other embodiments, additional operations are performed. Moreover, in some embodiments, the operations may be performed in different orders or in parallel. The operations can be performed by components 200 within a computing device 110 illustrated in FIG. 2, and/or various components of consumer account platform 120 illustrated in FIG. 3.

Operation 402 associates one or more consumer accounts with a computing device. The consumer accounts may be associated with the computing device by accessing a consumer account platform with the computing device. The consumer account platform may store a device identifier that is linked to the consumer account, and then provide requested account information to the computing device.

Operation 404 establishes an initial connection between a security device and the computing device. The security device may be a component of a payment card, which is linked to the computing device when a user receives the payment card. Alternatively, the security device may be a component of a point-of-sale terminal at a merchant. The security device may be linked to the computing device by pairing the security device and computing device together with a low-energy wireless connection, such as Bluetooth or near-field communication (NFC).

Operation 406 receives a transaction request for one of the consumer accounts associated with a computing device. The transaction request may come from a point-of-sale terminal at a merchant, or from any transaction where the consumer account is being accessed. The transaction request may be sent to the computing device via the consumer account platform.

After receiving the transaction request, operation 408 detects whether the security device is proximate to the computing device. The computing device may determine whether the security device is proximate by detecting whether a wireless connection with the security device can be established. Alternatively, the computing device may determine whether the security device is proximate by comparing the location of the computing device to the location of the security device. In some embodiments, the location of the security device may be obtained with the transaction request from a merchant.

When the computing device determines that the security device is not proximate, operation 410 prevents the consumer account from being used in the transaction. The computing device may lock or close the consumer account or send a message to a computing device associated with the account issuer to prevent the consumer account from used in the transaction. In some embodiments, the computing device (or the computing device associated with the account issuer) may lock or close all consumer accounts associated with the computing device when the security device is not proximate. The computing device may also provide a notification to the user that the security device is not proximate. The user may then be given an option to perm it the transaction or lock one or more of the consumer accounts.

When the computing device determines that security device is proximate, then operation 412 permits the consumer account to be used in the transaction.

Computer System Overview

Figure 5:
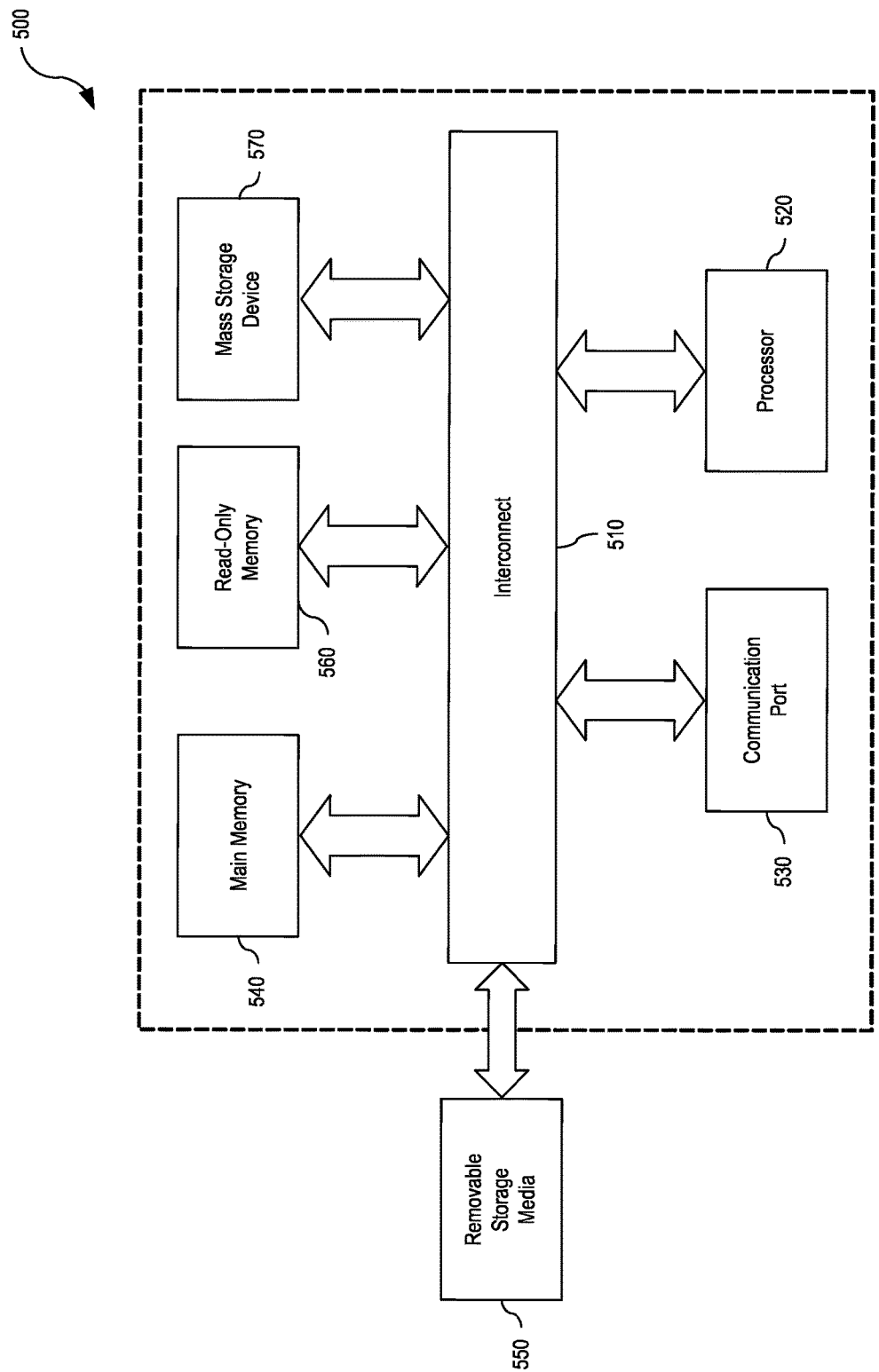
FIG. 5 is an example of a computer system with which embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system includes an interconnect 510, at least one processor 520, at least one communication port 530, a main memory 540, a removable storage media 550, a read only memory 560, and a mass storage device 570.

Processor(s) 520 can be any known processor, such as, but not limited to, an Intel® Itanium® or Itanium 2® processor(s), or AMD® Opteron® or Athlon MP® processor(s), or Motorola® lines of processors. Communication port(s) 530 can be any of an RS-232 port for use with a modem-based dialup connection, a 10/100 Ethernet port, or a Gigabit port using copper or fiber. Communication port(s) 530 may be chosen depending on a network such a Local Area Network (LAN), Wide Area Network (WAN), or any network to which the computer system 500 connects.

Main memory 540 can be random access memory (RAM) or any other dynamic storage device(s) commonly known in the art. Read-only memory 560 can be any static storage device(s) such as programmable read-only memory (PROM) chips for storing static information, such as instructions for processor 520.

A mass storage device 570 can be used to store information and instructions. For example, hard disks such as the Adaptec® family of SCSI drives, an optical disc, an array of disks such as RAID, the Adaptec family of RAID drives, or any other mass storage devices may be used.

Interconnect 510 communicatively couples processor(s) 520 with the other memory, storage, and communication blocks. Interconnect 510 can be a PCI/PCI-X- or SCSI-based system bus, depending on the storage devices used.

Removable storage media 550 can be any kind of external hard-drives, floppy drives, (OMEGA® Zip Drives, compact disc—read-only memory (CD-ROM), compact disc—re-writable (CD-RW), digital video disc—read-only memory (DVD-ROM).

The components described above are meant to exemplify some types of possibilities. In no way should the aforementioned examples limit the disclosure, as they are only exemplary embodiments.

TERMINOLOGY

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may comprise multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for an automated proximity fraud account lock. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
    sending, by a portable computing device, a transaction request for initializing a transaction using at least one user-selected consumer account, wherein the at least one user-selected consumer account is linked to a security device;
    in response to the transaction request, detecting, by the portable computing device, whether the security device is within a proximity to the portable computing device by determining whether the security device and the portable computing device are within communication range of each other,
        wherein the portable computing device is in communication with a point-of-sale terminal associated with a merchant, and wherein the security device and the portable computing device are associated with a user;
    in response to the portable computing device not being within the proximity to the security device, displaying, by the portable computing device, an option to lock or allow usage of the at least one user-selected consumer account linked to the security device;
    receiving, by the portable computing device, an indication that the user selected the option to lock the at least one user-selected consumer account linked to the security device; and
    in response to the indication to lock the at least one user-selected consumer account linked to the security device, locking by the portable computing device, the at least one user-selected consumer account to prevent the at least one user-selected consumer account from being used in the transaction with the point-of-sale terminal.

2. The method of claim 1, further comprising:
determining whether the security device has been previously paired with the portable computing device.

3. The method of claim 1, further comprising:
verifying the security device as authentic based on at least one security device identifier.

4. The method of claim 1, further comprising:
establishing, via a network, a connection with the security device.

5. The method of claim 1, further comprising:
in response to identifying that a merchant associated with the point-of-sale terminal is not an approved merchant, locking, by the portable computing device, the at least one user-selected consumer account.

6. The method of claim 1, further comprising:
in response to identifying that an amount of the transaction exceeds a transaction limit associated with the at least one user-selected consumer account linked to the security device, locking, by the portable computing device, the at least one user-selected consumer account.

7. The method of claim 1, wherein the security device comprises one or more of: a ring, a wallet, a watch, a necklace, a wristband, a purse, or a physical token.

8. A system comprising:
    a portable computing device including:
        one or more processors; and
        one or more memories storing instructions that, when executed by the one or more processors, cause the system to perform a process comprising:
            sending, the portable computing device, a transaction request for initializing a transaction using at least one user-selected consumer account, wherein the at least one user-selected consumer account is linked to a security device;
            in response to the transaction request, detecting, by the portable computing device, whether the security device is within a proximity to the portable computing device by determining whether the security device and the portable computing device are within communication range of each other, wherein the portable computing device is in communication with a point-of-sale terminal associated with a merchant, and wherein the security device and the portable computing device are associated with a user;

in response to the portable computing device not being within the proximity to the security device, displaying, by the portable computing device, an option to lock or allow usage of the at least one user-selected consumer account linked to the security device;

receiving, ty the portable computing device, an indication that the user selected the option to lock the at least one user-selected consumer account linked to the security device; and in response to the indication to lock the at least one user-selected consumer account linked to the security device, locking by the portable computing device, the at least one user-selected consumer account to prevent the at least one user-selected consumer account from being used in the transaction with the point-of-sale terminal.

9. The system according to claim 8, further comprising at least one server, wherein the process further comprises:
determining, by the at least one server, whether the security device has been previously paired with the portable computing device.

10. The system according to claim 8, further comprising at least one server, wherein the process further comprises:
verifying, by the at least one server, the security device as authentic based on at least one security device identifier.

11. The system according to claim 8, wherein the process further comprises:
establishing, via a network, a connection with the security device.

12. The system according to claim 8, wherein the process further comprises:
in response to identifying that a merchant associated with the point-of-sale terminal is not an approved merchant, locking, by the portable computing device, the at least one user-selected consumer account.

13. The system according to claim 8, wherein the process further comprises:
in response to identifying that an amount of the transaction exceeds a transaction limit associated with the at least one user-selected consumer account linked to the security device, locking, by the portable computing device, the at least one user-selected consumer account.

14. The system according to claim 8, wherein the security device comprises one or more of: a ring, a wallet, a watch, a necklace, a wristband, a purse, or a physical token.

15. A non-transitory computer-readable medium storing instructions that, when executed by a computing system, cause the computing system to perform operations comprising:
sending, by a portable computing device, a transaction request for initializing a transaction using at least one user-selected consumer account, wherein the at least one user-selected consumer account is linked to a security device;

in response to the transaction request, detecting, by the portable computing device, whether the security device is within a proximity to the portable computing device by determining whether the security device and the portable computing device are within communication range of each other, wherein the portable computing device is in communication with a point-of-sale terminal associated with a merchant, and wherein the security device and the portable computing device are associated with a user;

in response to the portable computing device not being within the proximity to the security device, displaying, by the portable computing device, an option to lock or allow usage of the at least one user-selected consumer account linked to the security device;

receiving, ty the portable computing device, an indication that the user selected the option to lock the at least one user-selected consumer account linked to the security device; and in response to the indication to lock the at least one user-selected consumer account linked to the security device, locking by the portable computing device, the at least one user-selected consumer account to prevent the at least one user-selected consumer account from being used in the transaction with the point-of-sale terminal.

16. The non-transitory computer-readable medium of claim 15, wherein the operations further comprise:
determining whether the security device has been previously paired with the portable computing device, wherein the security device comprises one or more of: a ring, a wallet, a watch, a necklace, a wristband, a purse, or a physical token.

17. The non-transitory computer-readable medium of claim 15, wherein the operations further comprise:
verifying the security device as authentic based on at least one security device identifier.

18. The non-transitory computer-readable medium of claim 15, wherein the operations further comprise:
establishing, via a network, a connection with the security device.

19. The non-transitory computer-readable medium of claim 15, wherein the operations further comprise:
in response to identifying that a merchant associated with the point-of-sale terminal is not an approved merchant, locking, by the portable computing device, the at least one user-selected consumer account.

20. The non-transitory computer-readable medium of claim 15, wherein the operations further comprise:
in response to identifying that an amount of the transaction exceeds a transaction limit associated with the at least one user-selected consumer account linked to the security device, locking, by the portable computing device, the at least one user-selected consumer account.

* * * * *